JAMES C. KYLE
GERALD R. CURTIS
INVENTORS.

BY Lyon & Lyon
ATTORNEYS.

United States Patent Office

3,056,934
Patented Oct. 2, 1962

3,056,934
POTENTIOMETERS
James C. Kyle, Glendora, and Gerald R. Curtis, Duarte, Calif., assignors to Physical Sciences Corporation, a corporation of California
Filed Nov. 5, 1959, Ser. No. 851,095
7 Claims. (Cl. 338—12)

This invention relates to potentiometers and, more particularly, to improvements therein.

In many of the present-day investigations, potentiometers associated with other apparatus are placed in environments wherein they are subjected to sudden acceleration and deceleration forces. As is well known, a potentiometer usually consists of a winding, across which a potential is applied, and an arm having a wiper for slidably contacting this winding at positions along its length. Due to the inertia of the arm and wiper, the sudden accelerations and decelerations cause vibration, as well as excessive wear, to the wiper and winding. This is not as serious as the fact that it is during these acceleration and deceleration intervals that oftentimes an accurate reading is desired of the position of the wiper arm on the winding. Because of the chatter or vibration which occurs, such reading cannot be obtained.

In order to minimize the inertial effects, the weight of the wiper and arm are reduced as much as possible. For best results, a certain amount of wiper contact pressure is required. It is necessary to make the wiper of spring material of a certain size and shape to obtain such contact pressure. Thus, the minimum mass for the wiper is fixed. Although using this minimum mass helps the situation somewhat, it does not completely correct it.

An object of this invention is to provide an improved structure for a potentiometer whereby the effects of inertia thereon are minimized.

Yet another object of the present invention is to provide an arrangement for a potentiometer which enables still a further reduction in the mass of the arm connected to the wiper of a potentiometer.

Still a further object of the present invention is the provision of a novel and improved potentiometer structure.

These and other objects of the invention are achieved in an arrangement whereby magnetic means are positioned within a potentiometer at a location to draw the wiper toward the potentiometer winding. Since in this manner the spring construction heretofore used to urge the wiper toward the winding is eliminated, the weight of the wiper and arm can be considerably reduced. Furthermore, by making the magnetic means an electromagnet, the wiper need not contact the winding until the electromagnet is excited. As a result, motion of the wiper arm which occurs when the electromagnet is not excited does not cause any contact and winding wear. Also, this arrangement enables commutation employing a plurality of potentiometers.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
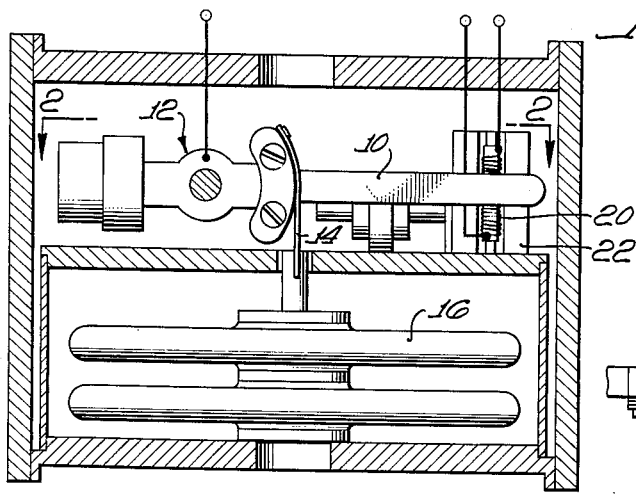
FIGURE 1 is a view of an embodiment of the invention.
Figure 2:
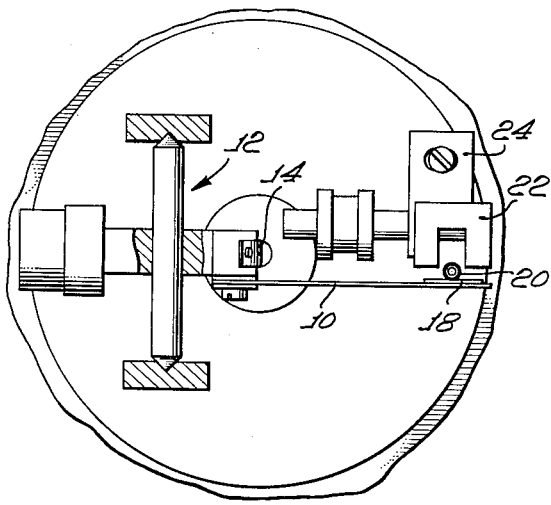
FIGURE 2 is a side view of the embodiment of the invention taken along the line 2—2 in FIGURE 1.

Referring now to FIGURES 1 and 2, there is shown the structure of an embodiment of the invention suitable for use in aircraft, for example, where it is desired to vary a potentiometer with changes in air pressure. The potentiometer will include a wiper arm 10, which is pivotably supported and counterbalanced by suitable structure 12. The wiper arm 10 is moved by a rod 14, which is connected to a bellows 16. The bellows is sealed, after being filled with air at a desired pressure. Variations in the pressure of the air in the environment in which the bellows is placed will result in an expansion or contraction thereof, with the resultant moving of the rod 14 and wiper arm 10.

The wiper arm 10 supports the wiper 18 proximal to an impedance member such as a suitably supported potentiometer winding 20. The free end of the wiper arm is maintained in contact with the winding by reason of the pull of a magnet 22, which is held by a support 24 in position on the opposite side of the winding 20, to draw the wiper and arm toward the winding. As shown, the magnet has a length greater than that of the winding, so that the magnetic pull upon the wiper and arm is uniform over the entire length of the winding. As best seen in FIGURE 2, the magnet 22 has a U-shaped configuration with a pair of legs encompassing the impedance member and forming a closed magnetic circuit with the free end of the movable arm. The magnet 22 is disposed in a direction transverse to the impedance member. The transverse direction may actually be perpendicular.

Since in accordance with this invention the contact between the wiper and the winding is caused solely by the magnet 22, the wiper and arm mass may be reduced considerably below the values hitherto possible with spring-biased types of wiper arms. Thus, inertial effects are minimized. Also, positional effects are eliminated, since obviously the magnet exerts its force, regardless of what position the potentiometer is placed. It should be noted that the bellows-driven type of potentiometer shown in the drawings should not be taken as a limitation upon the invention, but merely exemplary of the use thereof. It is obvious that a magnetic means for attracting and holding a wiper in contact with the winding of a potentiometer may be employed with other types of potentiometers than the one shown, without departing from the spirit and scope of the invention herein.

Figure 3:
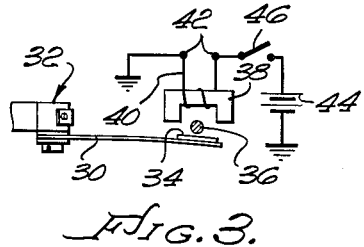
FIGURE 3 is a plan view of another embodiment of the invention.

FIGURE 3 illustrates an embodiment of the invention wherein the magnet 22 shown in FIGURES 1 and 2 is an electromagnet instead of a permanent magnet. A wiper arm 30 is pivotably supported by a suitable structure 32. The wiper arm 30 is made of a light spring material, so that when no attracting force is applied thereto, then the wiper 34 is maintained out of contact with the winding 36. An electromagnet 38 is positioned in the manner shown in FIGURES 1 and 2 on the side of the winding opposite to the side at which the wiper is positioned. Electromagnet 38 includes a winding 40, having terminals 42, to which there may be applied, when desired, exciting current from a battery 44. A switch 46 is closed to connect the battery to the terminals 42. When the winding 40 is excited by current from the battery 44, then the wiper and arm are drawn in contact with the potentiometer winding 36. At this time, a reading may be obtained of the voltage representative of the position of the arm along with the winding.

Figure 4:
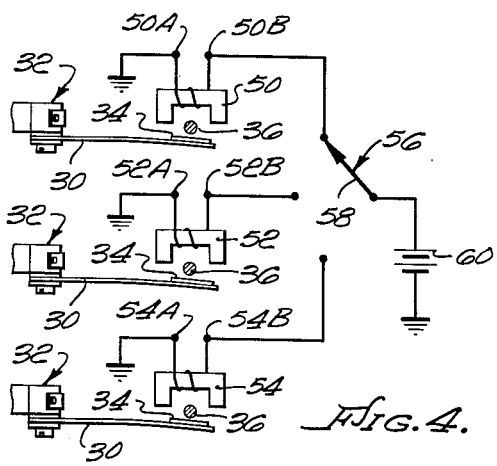
FIGURE 4 illustrates the embodiment of the invention being employed for commutating between potentiometers.

FIGURE 4 illustrates one commutating arrangement which may be employed for selectively reading the output of any one of a plurality of potentiometers. Three potentiometers 50, 52, 54 are shown, each one being the same type as that shown in FIGURE 3. A selector switch 56 is shown. One of the terminals 50A, 52A, 54A of the winding of each of the electromagnets is grounded. The other potential terminal 50B, 52B, 54B of the winding of each of the electromagnets is connected to a different contact of the selector switch 56. The selecting arm 58 of the selector switch 56 is connected to a source of potential 60, which is connected in turn to ground.

It will be appreciated that with the simple circuits shown, by selectively exciting the electromagnets of the respective potentiometers, the potentiometer outputs may be selectively read. Since the wiper in each potentiometer only contacts the winding in the potentiometer for the purpose of a reading, wear caused by sliding of the potentiometer wiper on the winding is avoided.

Figure 5:
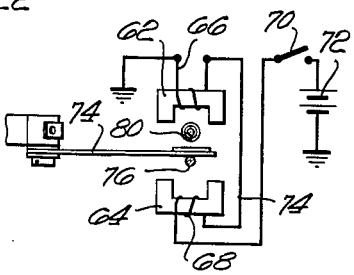
FIGURE 5 is a schematic arrangement illustrating yet another embodiment of the invention.

FIGURE 5 illustrates an embodiment of the invention which employs two magnets 62, 64. One of these 62 is an electromagnet having an exciting winding 66. The other is a permanent magnet 64 around which is wound a winding 68. The windings 66, 68 are connected in series with one another and to a switch 70. A battery 72 exemplifies a source of current which is connected to the two windings 66, 68 when the switch 70 is closed.

With the switch 70 open, the permanent magnet 64 draws the wiper arm 74 against a stop 76. Thus, during shipment or when not in use the wiper is maintained out of contact with the potentiometer winding 80. Thus, there is no wear except when the potentiometer is actually used. When the switch 70 is closed the resulting flow of current through the winding 68 sets up a field which opposes that of the permanent magnet 64 and essentially neutralizes it. The electromagnet 62 is energized and draws the wiper arm 74 up against the potentiometer winding 80. The potentiometer can now provide an output signal.

There has accordingly been described and shown herein a novel and useful potentiometric arrangement for minimizing the effects of inertia, for avoiding excessive wear, and for providing a potentiometric arrangement whereby readings are always available, regardless of potentiometer attitude or motion.

We claim:

1. In combination, an impedance member formed from a plurality of turns disposed in spaced relationship to one another, a movable arm made from a spring material, the movable arm having a free end disposed in adjacent relationship to the turns of the impedance member and provided with magnetizable properties, the movable arm being pivotable in a first annular direction at a position displaced from the free end to become disposed in adjacent relationship to successive turns of the impedance member, and magnetic means having a pair of legs encompassing the impedance member and forming a closed magnetic circuit with the free end of the movable arm to pivot the movable arm in a second direction transverse to the first direction for an engagement between the movable arm and the individual turns of the impedance member.

2. The combination set forth in claim 1 in which second magnetic means is disposed in spaced relationship to the movable arm in the second direction and on the opposite side of the movable arm from the first magnetic means and in which a switch is provided and in which the second magnetic means constitutes an electromagnet and in which the switch and the second magnetic means are included in a circuit to counteract the force exerted on the movable arm by the first magnetic means in accordance with the closure of the switch.

3. In combination, an impedance member formed from a plurality of turns disposed in spaced relationship to one another in a first direction, magnetic means having a U-shaped configuration in a second direction transverse to the first direction and defined by a pair of spaced legs and a portion integrating the legs, the impedance member being disposed between the pair of legs in the magnetic means, and a movable arm pivotable at a first end and spring biased at a second end away from the impedance member and movable in the first direction into engagement with individual turns of the impedance member, the movable arm being disposed at its second end in adjacent relationship to the winding in the second direction in its spring biased relationship and being provided with magnetizable properties at its second end to define with the magnetic means a magnetic circuit having a closed loop for the creation of a force on the movable arm in the second direction to provide an engagement of the individual turns of the winding by the movable arm.

4. The combination set forth in claim 3 in which the magnetic means is a permanent magnet.

5. The combination set forth in claim 3 in which the magnetic means is an electromagnet and in which a switch is provided and in which the magnetic means and the switch are included in an electrical circuit for controlling the movement of the movable arm into engagement with the impedance member in accordance with the energizing of the switch.

6. In a potentiometer of the type having a winding and a wiper for slidably contacting said winding, the improvement comprising first and second magnetic means, means for holding said first magnetic means for attracting said wiper to contact said winding, means for holding said second magnetic means for attracting said wiper away from said winding, and means for rendering said first magnetic means operative and said second magnetic means inoperative and for rendering said first magnetic means inoperative when said second magnetic means is operative.

7. In a potentiometer of the type having a winding and a wiper for slidably contacting said winding, the improvement comprising an electromagnet, means positioning said electromagnet adjacent said winding for attracting said wiper to contact said winding when said electromagnet is energized, a permanent magnet, means positioning said permanent magnet adjacent said wiper for attracting said wiper away from said winding, winding means wound on said permanent magnet with a sense to establish an opposing magnetic field to that of said permanent magnet when energized, and means for energizing both said electromagnet and said winding means when it is desired to have said wiper contact said winding.

References Cited in the file of this patent

UNITED STATES PATENTS

| 1,607,512 | Churcher et al. | Nov. 16, 1926 |
| 2,467,497 | Ramos | Apr. 19, 1949 |
| 2,637,115 | Watson | May 5, 1953 |
| 2,847,528 | Combs | Aug. 12, 1958 |
| 2,871,676 | Miller et al. | Feb. 3, 1959 |

Dedication

3,056,934.—*James C. Kyle*, Glendora, and *Gerald R. Curtis*, Duarte, Calif. POTENTIOMETERS. Patent dated Oct. 2, 1962. Dedication filed June 3, 1970, by the assignee, *Physical Sciences Corporation*.
Hereby dedicates the entire term of said patent to the Public.
[*Official Gazette November 10, 1970.*]